US011395153B2

(12) United States Patent
Trajkovic et al.

(10) Patent No.: US 11,395,153 B2
(45) Date of Patent: *Jul. 19, 2022

(54) METHOD AND SYSTEM FOR WI-FI DATA TRANSMISSION

(71) Applicant: DALI SYSTEMS CO. LTD, Grand Cayman (KY)

(72) Inventors: Sasa Trajkovic, Burnaby (CA); Shawn Patrick Stapleton, Vancouver (CA); Qianqi Zhuang, Richmond (CA)

(73) Assignee: DALI WIRELESS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/891,918

(22) Filed: Jun. 3, 2020

(65) Prior Publication Data

US 2020/0296598 A1    Sep. 17, 2020

Related U.S. Application Data

(63) Continuation of application No. 15/907,153, filed on Feb. 27, 2018, now Pat. No. 10,681,563, which is a
(Continued)

(51) Int. Cl.
*H04W 16/26* (2009.01)
*H04B 10/2575* (2013.01)
(Continued)

(52) U.S. Cl.
CPC ...... *H04W 16/26* (2013.01); *H04B 10/25754* (2013.01); *H04W 84/12* (2013.01); *H04W 88/085* (2013.01)

(58) Field of Classification Search
CPC ..... H04B 7/022; H04B 7/15542; H04L 67/12; H04L 25/02; H04L 5/0048; H04W 24/02;
(Continued)

(56) References Cited

U.S. PATENT DOCUMENTS 7,231,224 B1    6/2007  Chesson
8,682,338 B2    3/2014  Lemson et al.
(Continued)

FOREIGN PATENT DOCUMENTS

CN          103180844 A        6/2013
WO     WO 2005/104576         11/2005
(Continued)

OTHER PUBLICATIONS

Cavendish, Dirceu "Evolution of Optical Transport Technologies: From SONET/SDH to WDM" IEEE Communications Magazine; Jun. 2000.
(Continued)

*Primary Examiner* — Dung B Huynh
(74) *Attorney, Agent, or Firm* — Artegis Law Group, LLP

(57) ABSTRACT

A system for networking Wi-Fi Access Points in a Distributed Antenna System includes a plurality of Digital Access Units (DAUs). The plurality of DAUs are coupled and operable to route signals between the plurality of DAUs. The system also includes a plurality of Digital Remote Units (DRUs) coupled to the plurality of DAUs and operable to transport signals between DRUs and DAUs and a plurality of DAU ports and DRU ports. The system further includes a Framer/Deframer, wherein the cellular payload data is separated from the IP data and a network switch. The IP data from a plurality of DAU and DRU ports are buffered and routed to a plurality of DAU and DRU ports. Furthermore, the system includes a plurality of Wi-Fi access points coupled via a mesh network to Wi-Fi access points connected to a plurality of DRUs.

12 Claims, 14 Drawing Sheets

Related U.S. Application Data continuation of application No. 14/189,044, filed on Feb. 25, 2014, now Pat. No. 9,955,361.

(60) Provisional application No. 61/869,539, filed on Feb. 26, 2013.

(51) Int. Cl.
*H04W 84/12* (2009.01)
*H04W 88/08* (2009.01)

(58) Field of Classification Search
CPC ... H04W 88/085; H04W 16/10; H04W 36/06; H04W 40/00; H04W 52/0206; H04W 72/0453; H04W 16/26; H04W 84/12
See application file for complete search history.

(56) References Cited

U.S. PATENT DOCUMENTS

| | | | |
|---|---|---|---|
| 8,737,300 B2 | 5/2014 | Stapleton et al. | |
| 8,848,766 B2 | 9/2014 | Lemson et al. | |
| 9,026,067 B2 | 5/2015 | Stapleton et al. | |
| 9,955,361 B2* | 4/2018 | Trajkovic | H04W 16/26 |
| 10,681,563 B2 | 6/2020 | Trajkovic et al. | |
| 2003/0086415 A1* | 5/2003 | Bernhard | H04W 80/06 370/352 |
| 2003/0179703 A1 | 9/2003 | Levy et al. | |
| 2004/0174900 A1* | 9/2004 | Volpi | H04L 29/06 370/466 |
| 2005/0074019 A1* | 4/2005 | Handforth | H04W 16/18 370/406 |
| 2005/0105552 A1 | 5/2005 | Osterling | |
| 2005/0157675 A1 | 6/2005 | Feder et al. | |
| 2005/0226625 A1 | 10/2005 | Wake et al. | |
| 2006/0215598 A1 | 9/2006 | Rai et al. | |
| 2007/0001821 A1 | 1/2007 | Berkman | |
| 2008/0084855 A1* | 4/2008 | Rahman | H04W 24/04 370/342 |
| 2008/0107014 A1 | 5/2008 | Huang et al. | |
| 2008/0137567 A1* | 6/2008 | Fang | H04W 28/06 370/310 |
| 2008/0181282 A1 | 7/2008 | Wala et al. | |
| 2008/0205261 A1* | 8/2008 | Mohebbi | H04B 7/15 370/210 |
| 2009/0047924 A1 | 2/2009 | Ray et al. | |
| 2009/0112585 A1 | 4/2009 | Cox et al. | |
| 2009/0129352 A1* | 5/2009 | Verma | H04L 63/101 370/338 |
| 2009/0180407 A1* | 7/2009 | Sabat | H04B 10/25754 370/280 |
| 2009/0180423 A1 | 7/2009 | Kroener | |
| 2009/0279520 A1* | 11/2009 | Maki | H04W 72/04 370/338 |
| 2009/0305671 A1* | 12/2009 | Luft | H04W 8/183 455/411 |
| 2010/0002662 A1* | 1/2010 | Schmidt | H04W 88/085 370/352 |
| 2010/0027457 A1* | 2/2010 | Okuda | H04W 72/0413 455/7 |
| 2010/0099451 A1 | 4/2010 | Saban et al. | |
| 2010/0177759 A1* | 7/2010 | Fischer | H04W 88/085 370/345 |
| 2010/0178936 A1* | 7/2010 | Wala | H04W 64/00 455/456.2 |
| 2010/0208777 A1 | 8/2010 | Ogaz | |
| 2010/0246482 A1* | 9/2010 | Erceg | H04W 16/28 370/328 |
| 2010/0266287 A1 | 10/2010 | Adhikari et al. | |
| 2011/0075633 A1* | 3/2011 | Johansson | H04W 36/02 370/328 |
| 2011/0135013 A1 | 6/2011 | Wegener | |
| 2011/0135308 A1 | 6/2011 | Tarlazzi et al. | |
| 2011/0141895 A1* | 6/2011 | Zhang | H04L 12/66 370/328 |
| 2011/0263198 A1* | 10/2011 | Wu | H04B 7/15542 455/7 |
| 2011/0310941 A1* | 12/2011 | Kenington | H04W 88/085 375/220 |
| 2012/0057572 A1 | 3/2012 | Evans et al. | |
| 2012/0077531 A1 | 3/2012 | Acharya et al. | |
| 2012/0134666 A1 | 3/2012 | Casterline et al. | |
| 2012/0127938 A1 | 5/2012 | Lv et al. | |
| 2012/0188949 A1 | 6/2012 | Salkintzis et al. | |
| 2012/0257516 A1 | 10/2012 | Pazhyannur et al. | |
| 2012/0329523 A1 | 12/2012 | Stewart et al. | |
| 2013/0029655 A1 | 1/2013 | Gao | |
| 2013/0114963 A1 | 5/2013 | Stapleton et al. | |
| 2013/0201916 A1 | 8/2013 | Kummetz et al. | |
| 2013/0272202 A1 | 10/2013 | Stapleton et al. | |
| 2014/0016583 A1 | 1/2014 | Smith | |
| 2014/0033049 A1 | 1/2014 | Sundaresan et al. | |
| 2014/0078906 A1 | 3/2014 | Chen et al. | |
| 2014/0089912 A1* | 3/2014 | Wang | G06F 8/65 717/173 |
| 2014/0119281 A1 | 5/2014 | Kummetz et al. | |
| 2014/0140225 A1 | 5/2014 | Wala | |
| 2014/0146797 A1* | 5/2014 | Zavadsky | H04L 5/0085 370/336 |
| 2014/0160937 A1* | 6/2014 | Richards | H04W 12/06 370/329 |
| 2014/0199994 A1* | 7/2014 | Richards | H04W 24/10 455/552.1 |
| 2014/0241157 A1 | 8/2014 | Tan et al. | |
| 2014/0269318 A1* | 9/2014 | Hasarchi | H04W 16/10 370/235 |
| 2015/0110014 A1* | 4/2015 | Wang | H04L 63/0853 370/329 |
| 2015/0282026 A1* | 10/2015 | Gupta | H04B 7/024 370/331 |
| 2015/0303999 A1 | 10/2015 | Zhuang et al. | |

FOREIGN PATENT DOCUMENTS

| | | |
|---|---|---|
| WO | WO 2010/133043 | 11/2010 |
| WO | WO 2012/024343 | 2/2012 |
| WO | WO 2015/103601 | 7/2015 |

OTHER PUBLICATIONS

Office Action for U.S. Appl. No. 16/189,044, dated Aug. 28. 2015.
Office Action for U.S. Appl. No. 16/189,044, dated Jun. 2, 2016.
Office Action for U.S. Appl. No. 16/189,044, dated May 18, 2017.
Notice of Allowance for U.S. Appl. No. 16/189,044, dated Nov. 28, 2017.
Office Action for U.S. Appl. No. 15/907,153, dated Nov. 16, 2018.
Office Action for U.S. Appl. No. 15/907,153, dated Aug. 1, 2019.
Notice of Allowance for U.S. Appl. No. 15/907,153, dated Feb. 11, 2020.

* cited by examiner

FIG. 1 Distributed Antenna System

FIG. 2 Digital Access Unit

FIG. 3 Digital Remote Unit

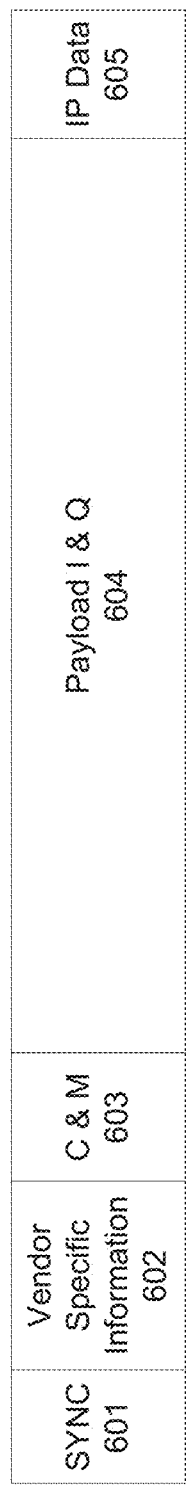
FIG. 6 Data Frame Structure

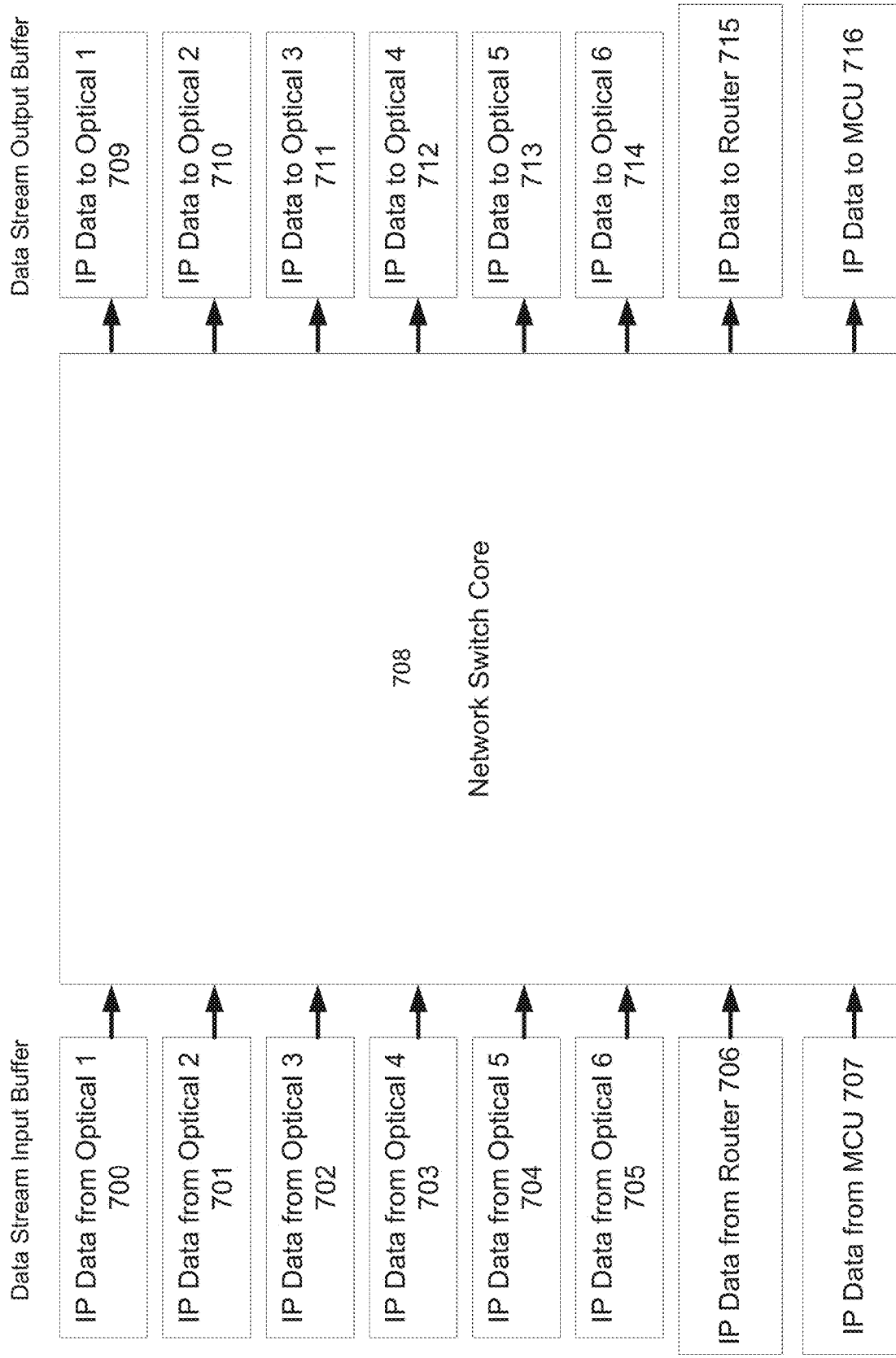
FIG. 7 Network Switch Block Diagram

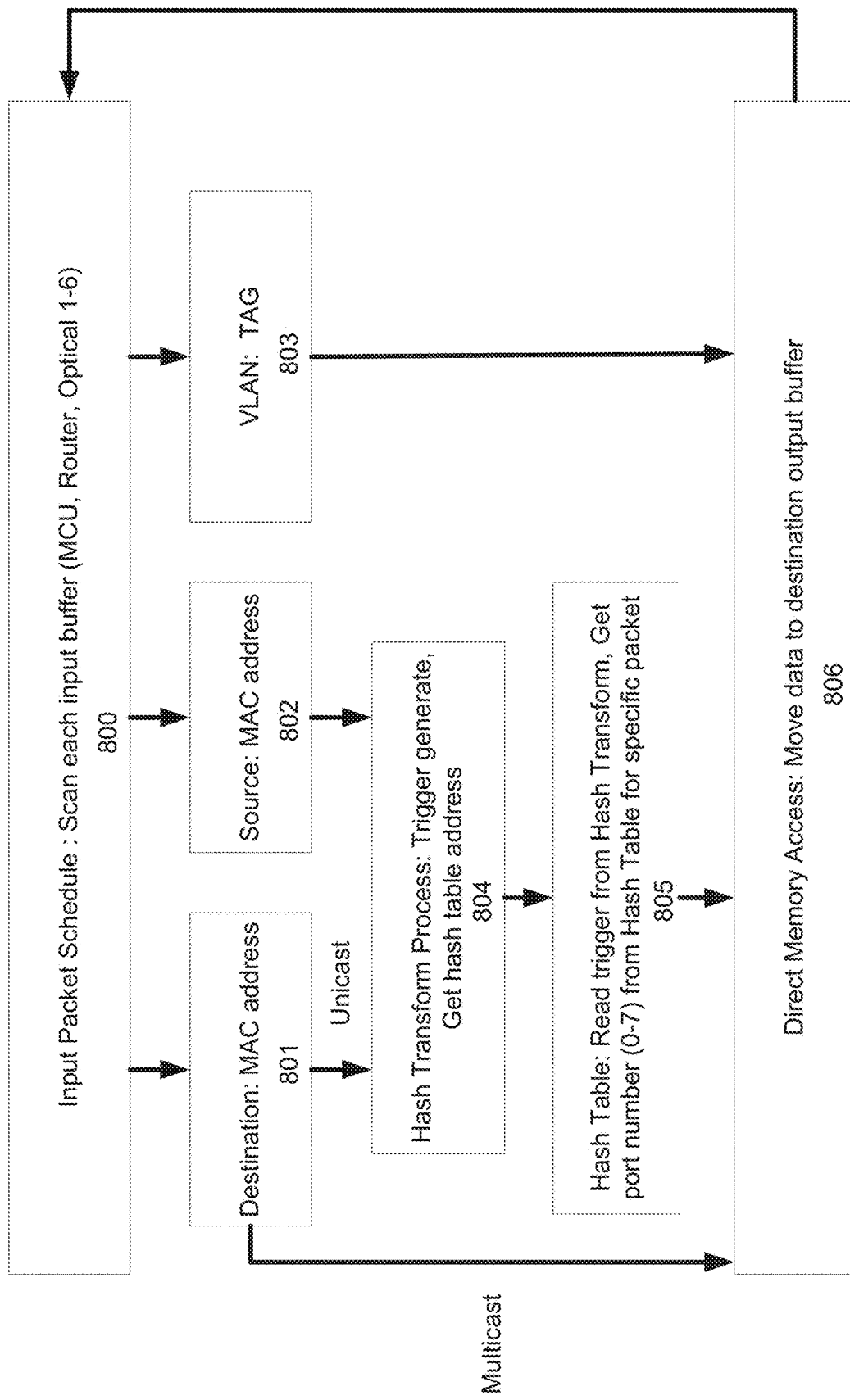
FIG. 8 Network Switch Core

| Address | Sub-Address (4 bits) | Reserved (8 bits) | TTL (4 bits) | Pnum (4 bits) | MAC address (48 bits) |
|---|---|---|---|---|---|
| 0 | 0 | | | | |
| | ... | | | | |
| | 15 | | | | |
| 1 | 0 | | | | |
| | ... | | | | |
| | 15 | | | | |
| ... | 0 | | | | |
| | ... | | | | |
| | 15 | | | | |
| 255 | 0 | | | | |
| | ... | | | | |
| | 15 | | | | |

900

FIG. 9 Hash Table Structure

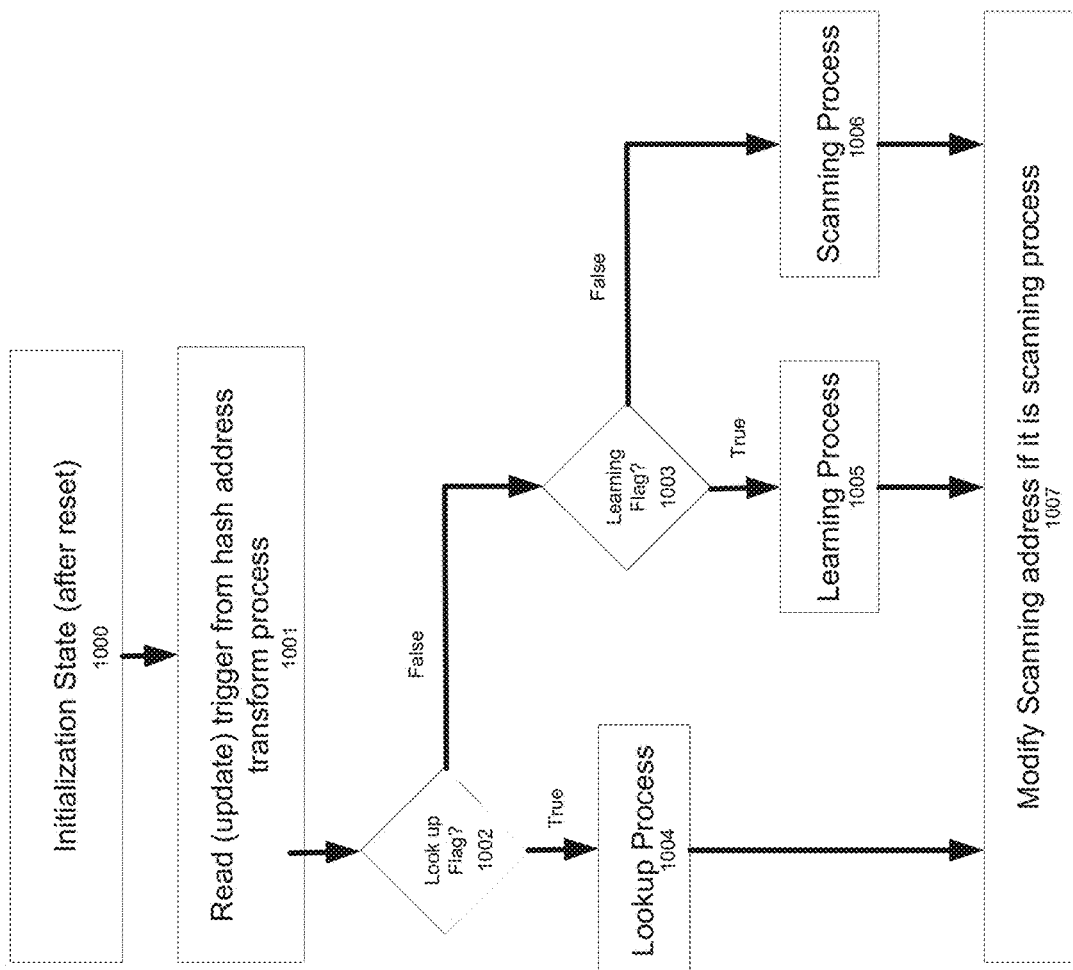
FIG. 10 Hash Table Schedule

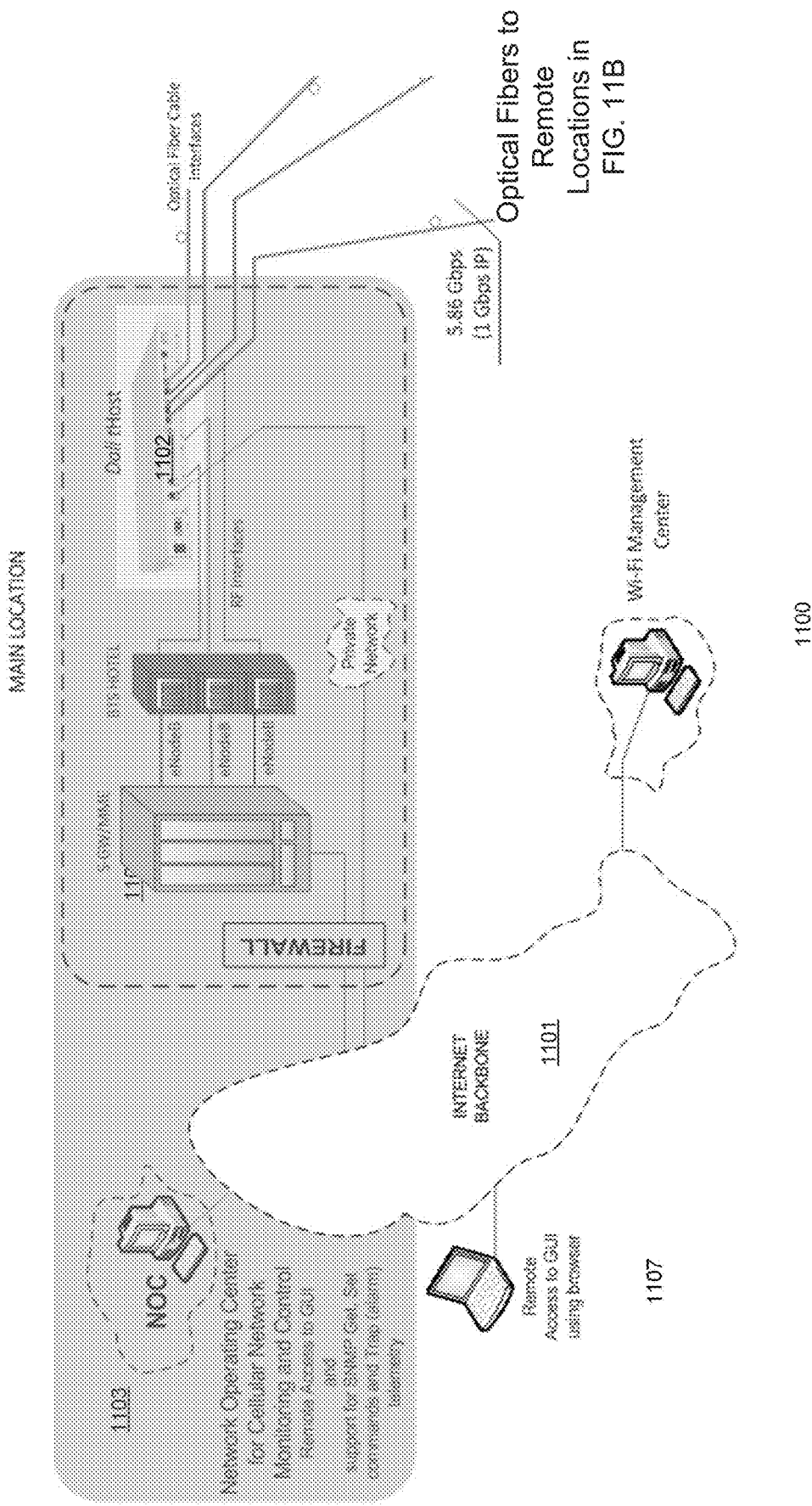
FIG. 11A IP Backhaul with Wifi Mesh Network – Main Location

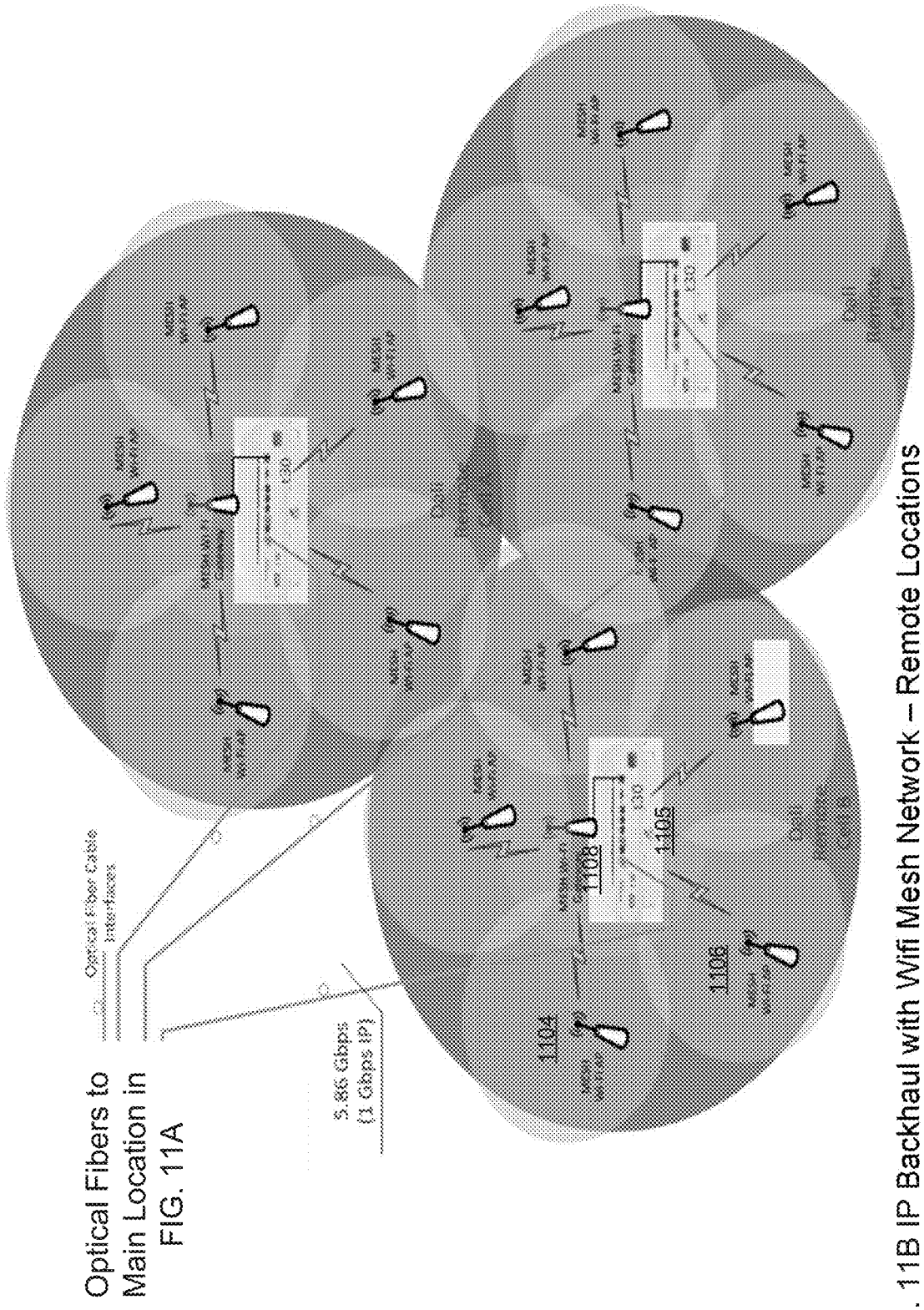
FIG. 11B IP Backhaul with Wifi Mesh Network – Remote Locations

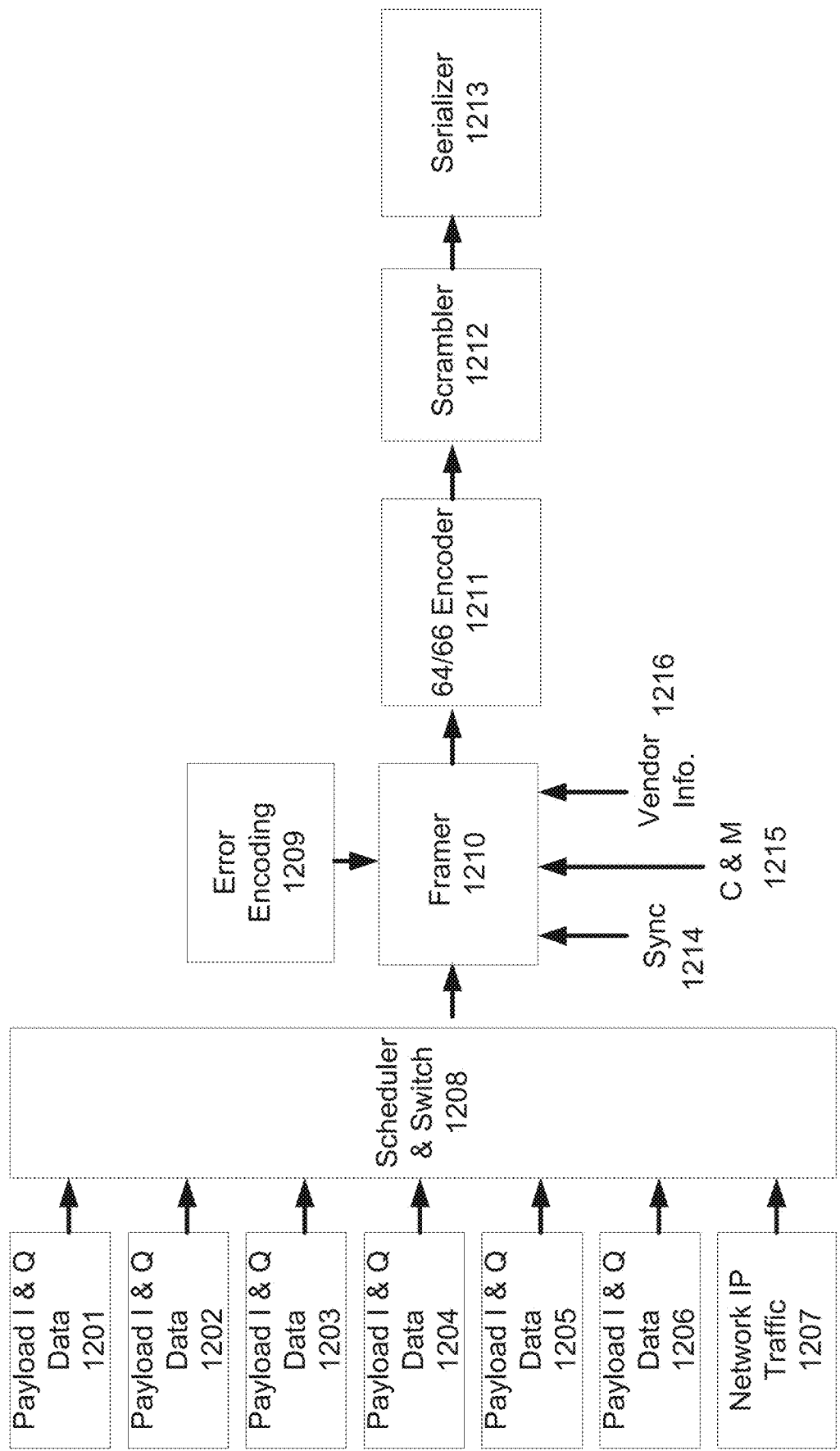
FIG. 12 Coding Data for DAU Downlink Path and DRU Uplink Path

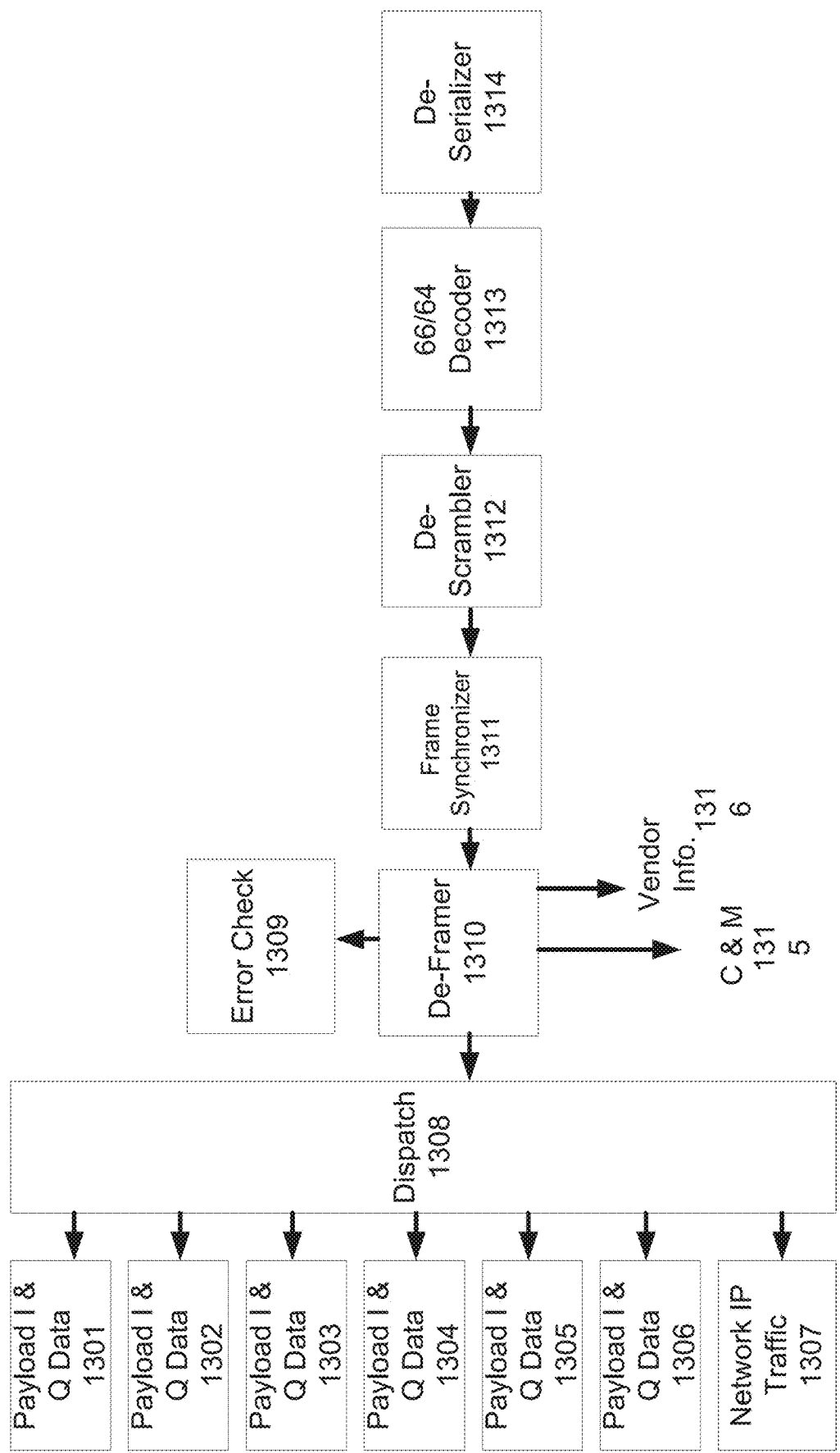
FIG. 13 Decoding Data for DAU Uplink Path and DRU Downlink Path

METHOD AND SYSTEM FOR WI-FI DATA TRANSMISSION

CROSS-REFERENCES TO RELATED APPLICATIONS

This application is a Continuation of U.S. application Ser. No. 15/907,153, filed Feb. 27, 2018, now U.S. Pat. No. 10,681,563, which is a Continuation of U.S. application Ser. No. 14/189,044, filed Feb. 25, 2014, now U.S. Pat. No. 9,955,361, which claims priority to U.S. Provisional Patent Application No. 61/769,539, filed on Feb. 26, 2013, entitled "Method and System for Wi-Fi Data Transmission," each of which are hereby incorporated by reference in their entirety for all purposes.

BACKGROUND OF THE INVENTION

Wireless and mobile network operators face the continuing challenge of building networks that effectively manage high data-traffic growth rates. Mobility and an increased level of multimedia content for end users requires end-to-end network adaptations that support both new services and the increased demand for broadband and flat-rate Internet access. One of the most difficult challenges faced by network operators is maximizing the capacity of their DAS networks while ensuring cost-effective DAS deployments and at the same time providing a very high degree of DAS remote unit availability.

In order to provide DAS network capacity which is high enough to meet short-term needs of network subscribers in specific locations yet also avoid costly and inefficient deployment of radio resources, DAS network planners prefer to employ DAS architectures and solutions which provide a high degree of dynamic flexibility. Therefore, it would be advantageous for wireless network operators to employ a DAS solution which has a high degree of flexibility to implement dynamic rearrangements based on ever-changing network conditions and subscriber needs. Also, the more future-proof a DAS deployment can be, generally the lower its life cycle cost.

Despite the advances made in DAS networks, there is a need in the art for improved methods and systems for providing Wi-Fi data transmission.

SUMMARY OF THE INVENTION

The present invention generally relates to communication systems using complex modulation techniques. More specially, the present invention relates to distributed antenna systems that contain a microprocessor or other digital components, such as a Field Programmable Gate Array (FPGA) or Application Specific Integrated Circuit (ASIC). Embodiments of the present invention provide a means of networking IP data over a Distributed Antenna System (DAS). A Distributed Antenna System provides a method of transporting mobile data between Base Transceiver Stations (BTSs) and remotely located units that are connected to antennas. IP data can be transported over the same medium as the mobile data if the two data streams are multiplexed in a Frame. A network switch is required to efficiently route the IP data between the multiple ports in the DAS network. A Wi-Fi access point integrated into the remote units can use the IP data backhaul of the DAS system. The remotely located Wi-Fi access points of the remote units can relay data via a mesh network to a second tier of Wi-Fi access points. The second tier of Wi-Fi access points will use the DAS IP Data stream as the backhaul.

The present invention is applicable to any communication system that transports mobile data over a medium. A communication link can be established between a local host unit and a remote unit. A Field Programmable Gate Array (FPGA) or Application Specific Integrated Circuit (ASIC) that incorporates a processor, such as a Power PC or Microblaze, controls the data flow to and from the Remote Unit.

BRIEF DESCRIPTION OF THE DRAWINGS

FIG. 6 shows the mapping of the data frame structure used to communicate between the DAU and the DRUs.

FIG. 7 is a block diagram of the Network Switch between the Input Ports and Output Ports.

FIG. 8 is the flow diagram for the Network Switch Core.

FIG. 9 is the Hash Table Structure

FIG. 10 depicts the Hash Table Scheduler algorithm.

FIG. 11A is a block diagram of a main location for a Wi-Fi Mesh Network fed by a IP data backhaul of a DAS system.

FIG. 11B is a block diagram of remote locations for a Wi-Fi Mesh Network fed by a IP data backhaul of a DAS system.

FIG. 12 is a block diagram of the coding structure at the Digital Access Unit (DAU) downlink path and Digital Remote Unit (DRU) uplink path.

FIG. 13 is a block diagram of the coding structure at the Digital Access Unit (DAU) uplink path and Digital Remote Unit (DRU) downlink path.

DETAILED DESCRIPTION OF SPECIFIC EMBODIMENTS

A distributed antenna system (DAS) provides an efficient means of utilization of base station resources. The base station or base stations associated with a DAS can be located in a central location and/or facility commonly known as a base station hotel. The DAS network comprises one or more digital access units (DAUs) that function as the interface between the base stations and the digital remote units (DRUs). The DAUs can be collocated with the base stations. The DRUs can be daisy chained together and/or placed in a star configuration and provide coverage for a given geographical area. The DRUs are typically connected with the DAUs by employing a high-speed optical fiber link. This approach facilitates transport of the RF signals from the base stations to a remote location or area served by the DRUs.

Figure 1:
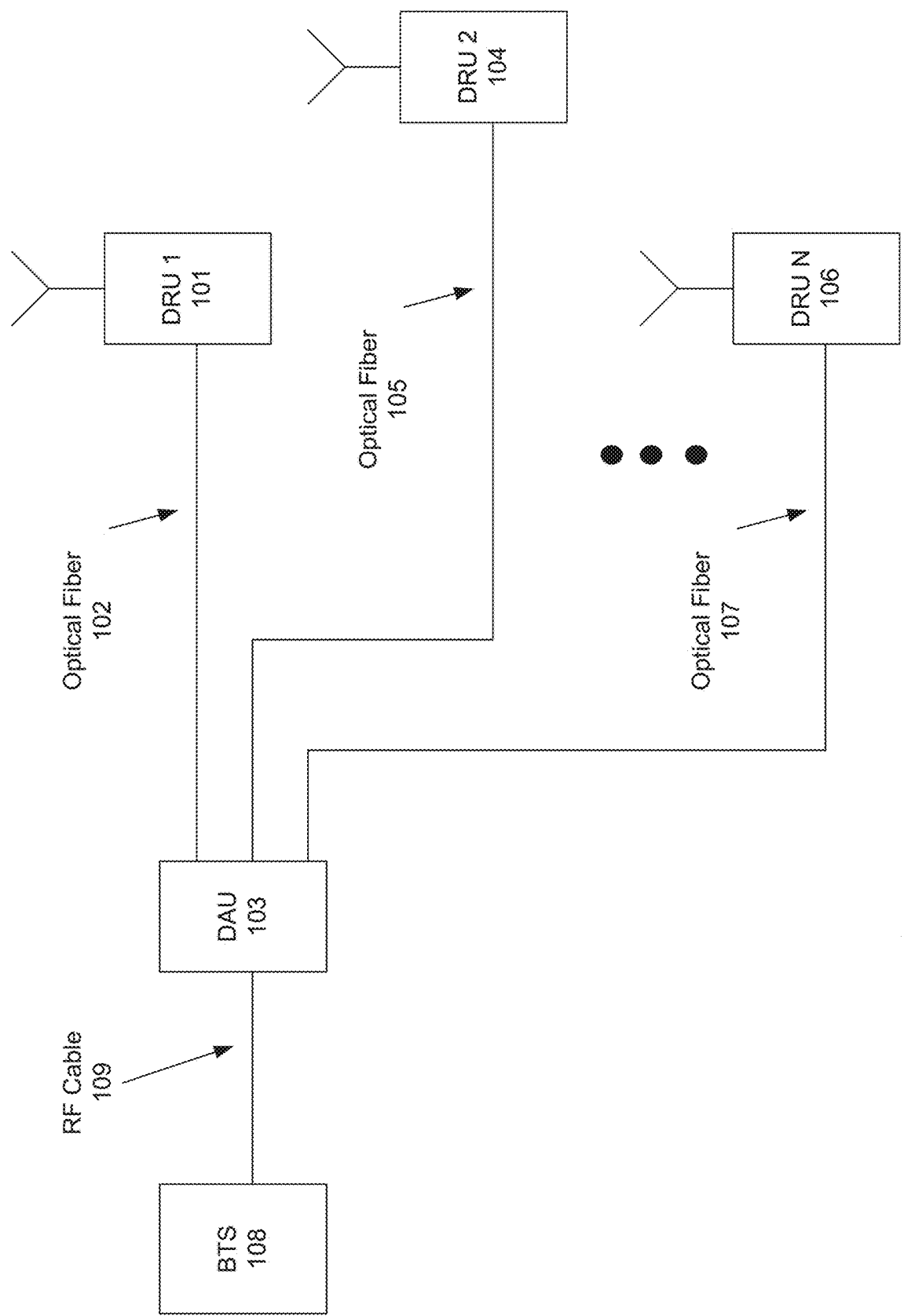
FIG. 1 is a block diagram showing a Distributed Antenna System (DAS), which includes one or more Digital Access Units (DAUs) and one or more Digital Remote Units (DRUs).

An embodiment shown in FIG. 1 illustrates a basic DAS network architecture according to an embodiment of the present invention and provides an example of a data transport scenario between a Base Station and multiple DRUs. In this embodiment, the DRUs are connected to the DAU in a star configuration to achieve coverage in a specific geographical area.

FIG. 1 is a block diagram of one embodiment of a Distributed Antenna System which includes one or more Digital Access Units 103 and one or more Digital Remote Units 101. The DAUs interface to one of more Base Transceiver Stations (BTS) 108. Up to N DRUs can be utilized in conjunction with a DAU. Additional description related to DAS architectures is provided in U.S. patent application Ser. No. 13/211,243, filed on Aug. 16, 2011, the disclosure of which is hereby incorporated by reference in its entirety for all purposes.

Figure 2:
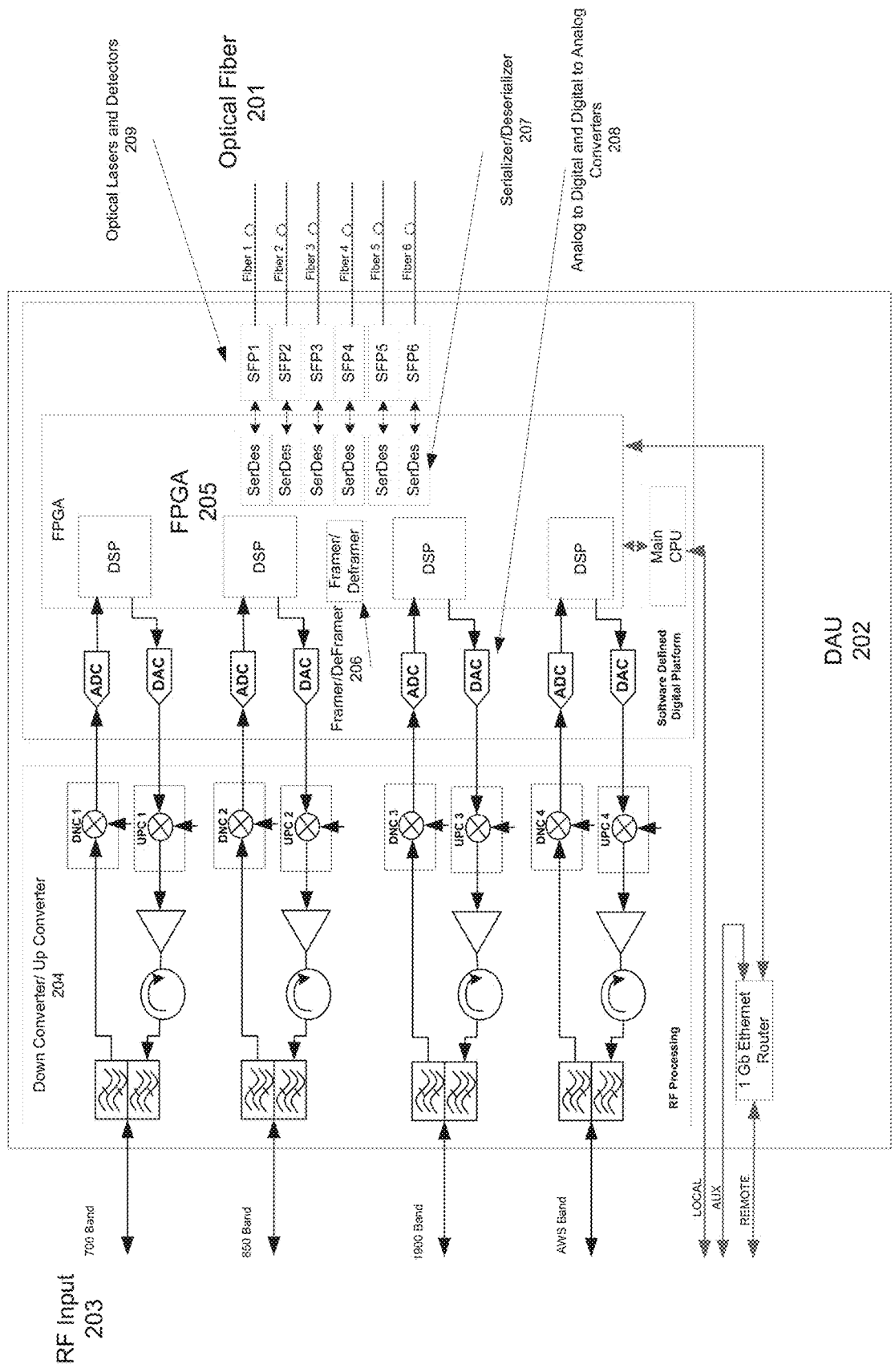
FIG. 2 is a block diagram of a Digital Access Unit (DAU).

FIG. 2 is a block diagram showing a DAU system for base-station applications according to one embodiment of the present invention. The DAU system for the base-station applications has RF input and output signals 203 and optical input and output signals 201. The DAU system includes four key parts; a FPGA-based digital part 205, a down converter and up-converter part 204, analog to digital and digital to analog converter part 208, and an optical laser and detector part 209. The FPGA-based digital part 205 includes a field programmable gate array (FPGA), digital signal processing (DSP) units, Framers/De-Framers, and Serializers/De-Serializers. Additional description related to DAUs is provided in U.S. patent application Ser. No. 12/767,669, filed on Apr. 26, 2010, Ser. No. 13/211,236, filed on Aug. 16, 2011, and Ser. No. 13/211,247, filed on Aug. 16, 2011, all of which are hereby incorporated by reference in their entirety for all purposes.

Figure 3:
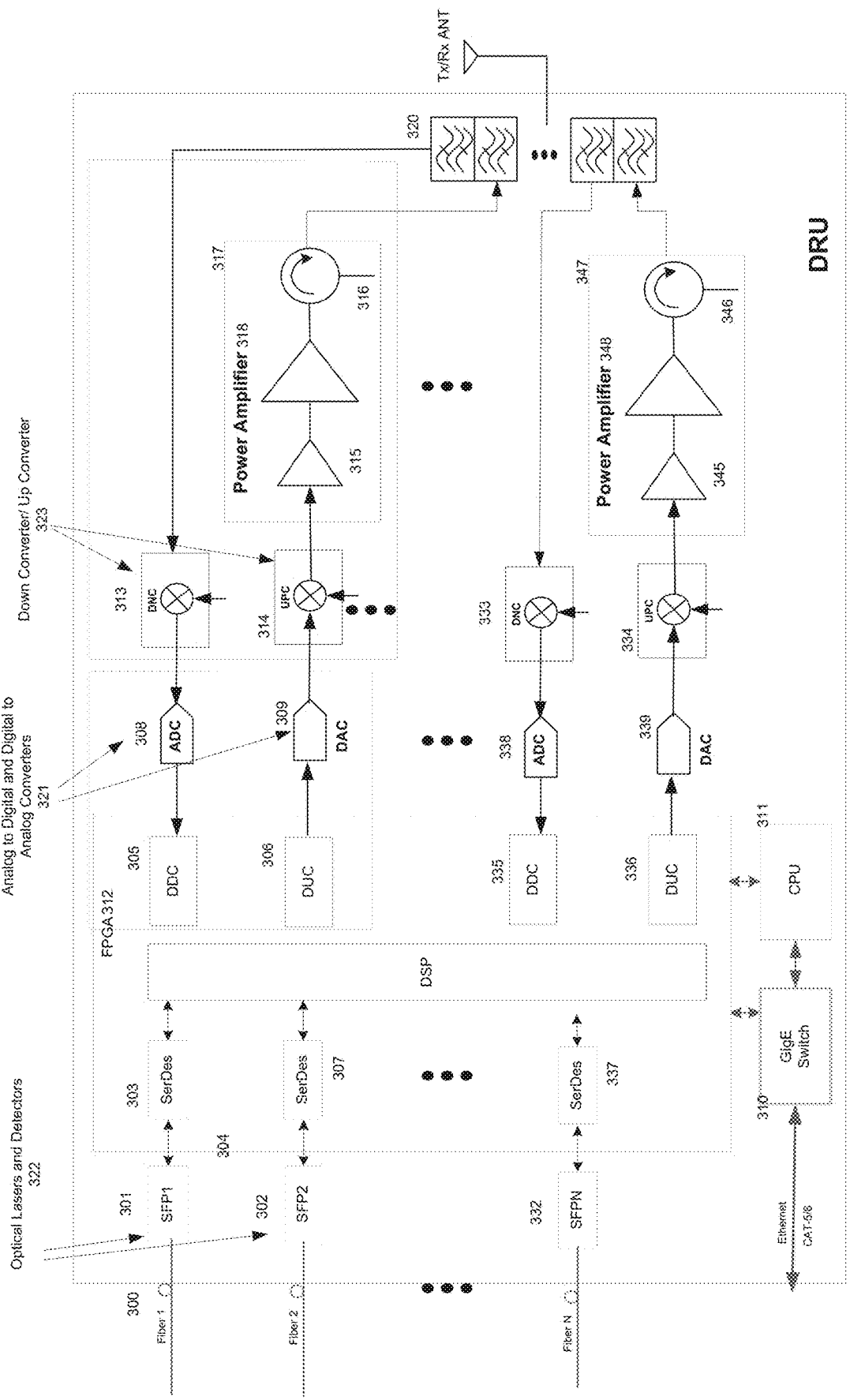
FIG. 3 is a block diagram of a Digital Remote Unit (DRU).

FIG. 3 is a block diagram showing a Digital Remote Unit (DRU) system according to one embodiment of the present invention. The DRU system has bidirectional optical signals 300 communicating with the DAU or other DRUs and bidirectional RF signals 320 transmitted and received by the RF antenna. The DRU system includes four key parts; a FPGA-based digital part 312, a down converter 313 and an up-converter 314 (the group labeled as 323), analog to digital (308) and digital to analog converter (309) (the group labeled as 321), an optical laser and detector part 322, and a power amplifier part 318.

Figure 4:
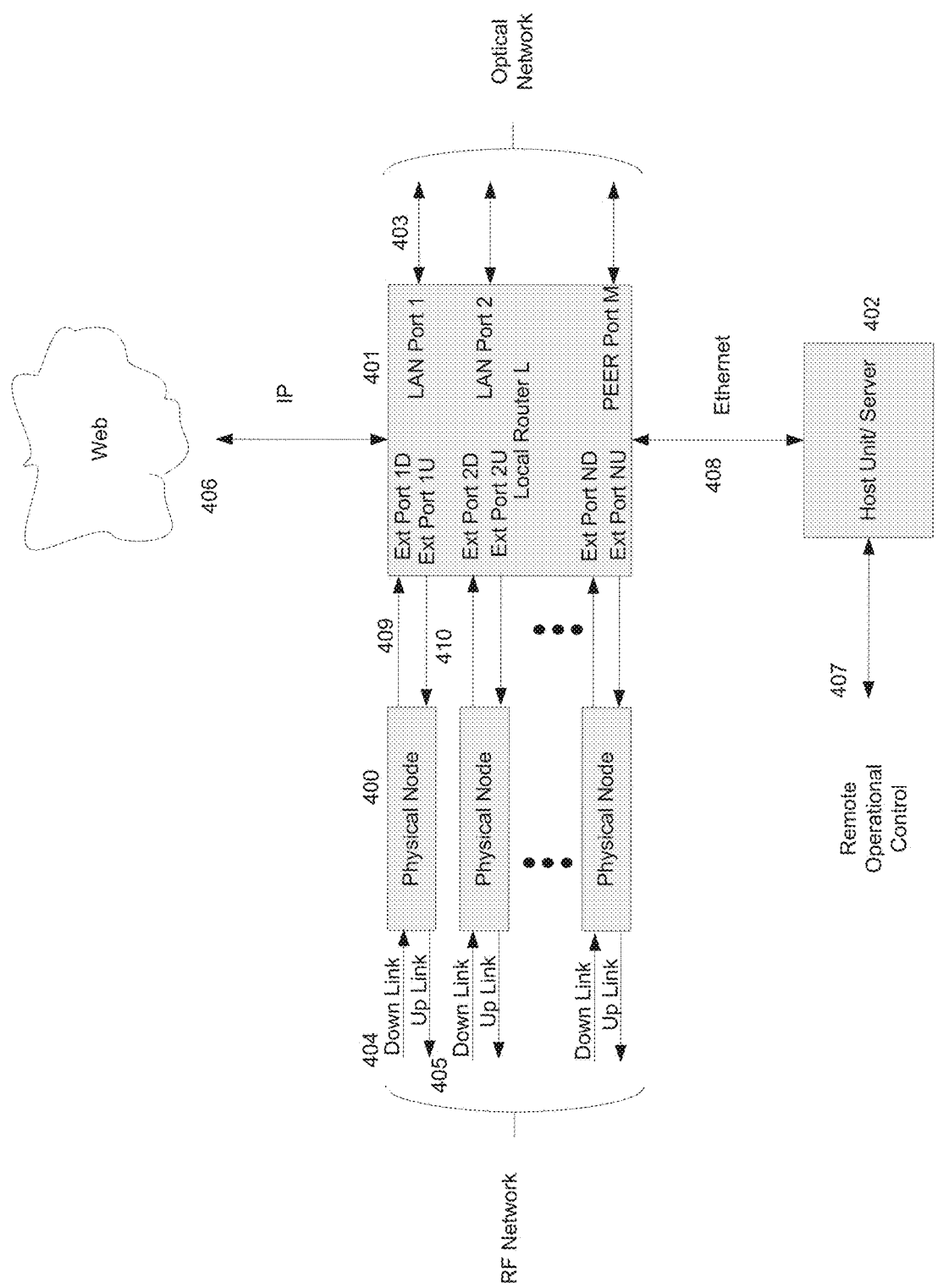
FIG. 4 is a block diagram illustrating a DAU, which contains physical Nodes and a Local Router, according to an embodiment of the present invention.

FIG. 4 shows an embodiment whereby the physical nodes have separate outputs for the uplinks (405) and separate inputs for the downlink paths (404). The physical node translates the signals from RF to baseband for the downlink path and from baseband to RF for the uplink path. The physical nodes are connected to a Local Router via external ports (409,410)). The router directs the uplink data stream from the LAN and PEER ports to the selected External U ports. Similarly, the router directs the downlink data stream from the External D ports to the selected LAN and PEER ports.

In one embodiment, the LAN and PEER ports are connected via an optical fiber to a network of DAUs and DRUs. The network connection can also use copper interconnections such as CAT 5 or 6 cabling, or other suitable interconnection equipment. The DAU is also connected to the internet network using IP (406). An Ethernet connection (408) is also used to communicate between the Host Unit and the DAU. The DRU can also connect directly to the Remote Operational Control center (407) via the Ethernet port.

Figure 5:
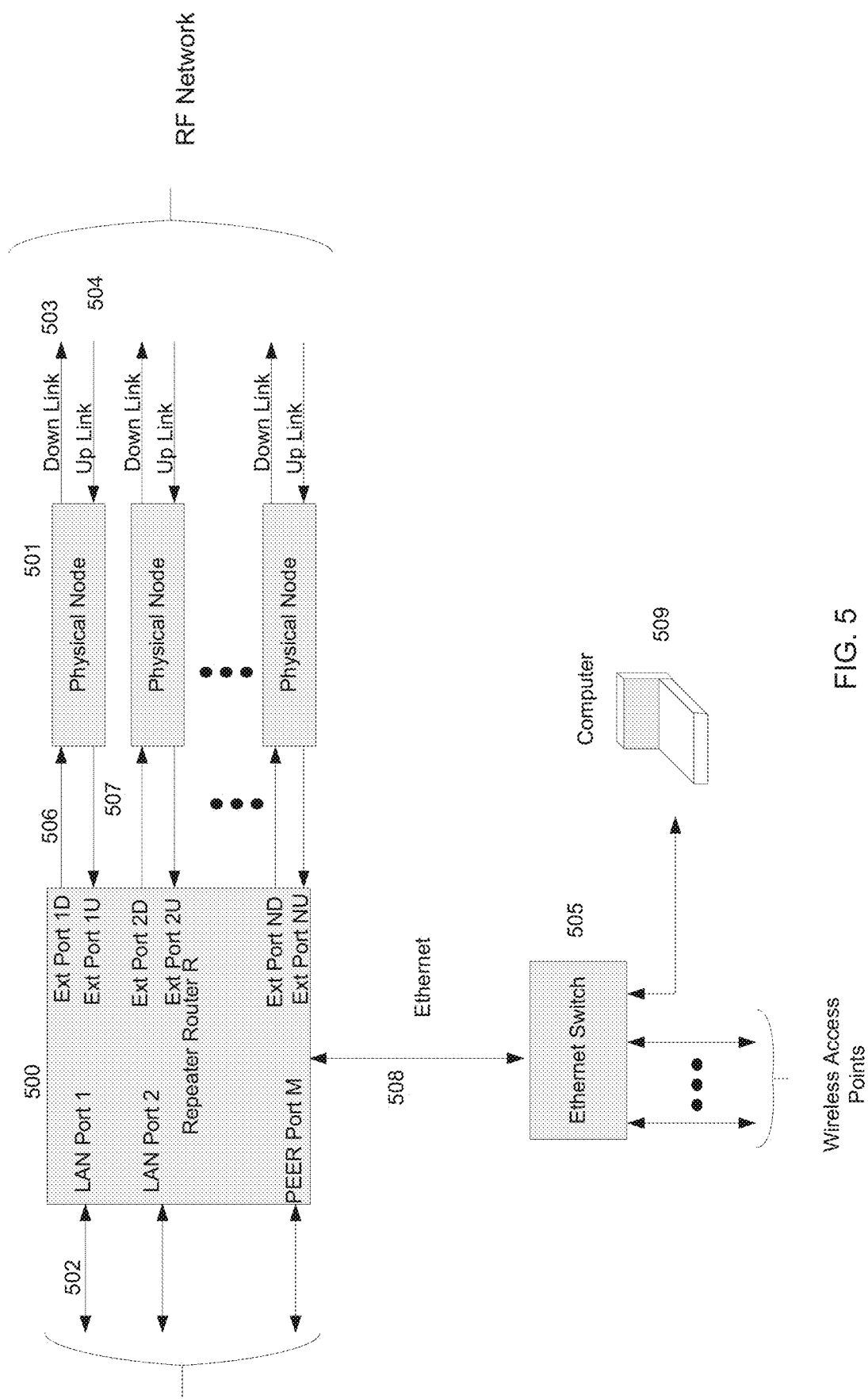
FIG. 5 is a block diagram illustrating a DRU according to an embodiment of the present invention.

FIG. 5 shows the two elements in a DRU, the Physical Nodes (501) and the Remote Router (500). The DRU includes both a Remote Router and Physical Nodes. The Remote Router directs the traffic between the LAN ports, External Ports and PEER Ports. The physical nodes connect to the mobile users at radio frequencies (RF). The physical nodes can be used for different operators, different frequency bands, different channels, etc. FIG. 5 shows an embodiment whereby the physical nodes have separate inputs for the uplinks (504) and separate outputs for the downlink paths (503). The physical node translates the signals from RF to baseband for the uplink path and from baseband to RF for the downlink path. The physical nodes are connected to a Remote Router via external ports (506,507). The router directs the downlink data stream from the LAN and PEER ports to the selected External D ports. Similarly, the router directs the uplink data stream from the External U ports to the selected LAN and PEER ports. The DRU also contains an Ethernet Switch (505) so that a remote computer or wireless access points can connect to the internet. A Wi-Fi access point can also be integrated into the DRU.

FIG. 6 shows an embodiment of the frame structure for the data that is transported between the DAU and DRUs. The data frame structure includes five portions or elements; the SYNC portion 601, the Vendor specific information portion 602, the control and management (C&M) portion 603, the payload data portion 604, and the IP Data portion 605. The SYNC portion 601 is used at the receiver to synchronize the clock of the transported data. The vendor specific information portion 602 is allocated for identifying the individual vendor information, which can include IP addresses associated with information and other information that can be specific to a particular vendor (e.g., a wireless carrier). The control and management portion 603 is used to monitor and control the remote units as well as perform software upgrades. Network control information and performance monitoring along with control signals can be transmitted in the C&M portion 603. The payload I/Q data portion 604 includes the cellular baseband data from the BTS 108 or from the RF antenna port 320.

FIG. 7 shows a block diagram of the Network Switch architecture for the multiple inputs and outputs of the IP data. The IP Data from the optical ports of the DRU or DAU are separated from the payload I,Q data in each frame. IP data can originate from an external router or from the Microprocessor in the DRU or DAU. The IP Network Traffic from multiple input ports are buffered and delivered to a network switch. The Network Switch routes the IP data from the multiple input ports to the multiple output ports.

FIG. 8 shows the block diagram of the Network Switch Core. The IP data from the various inputs (MCU, Router, Optical ports 1-6) are buffered and scanned by the input packet scheduler 800. The input packets are scanned for their MAC address, which identifies their Destination/Source address or whether they have a VLAN tag. If the Destination address is identified as Multicast then the input is sent to the destination output buffers of the Network Switch. The Source MAC address is fed to the Hash Transform Process along with the Destination MAC address when Unicast is identified. The Hash Transform Process and Hash Table are used to identify the routing path between the Input buffered IP data and the Output buffer for the IP data. The Hash Transform translates the MAC address to a Hash address and the Hash Table translates the Hash Address to the port number (MCU, Router, Optical ports 1-6).

FIG. 9 shows the Hash Table Structure that maps the MAC address to a Hash address. Pnum is the port number and TTL is the Time to live. 256 Hash addresses and 16 sub-addresses are identified in the table.

FIG. 10 shows the flow diagram for the Hash Table Schedule. The trigger is read from the hash address process to identify if the routing path of the IP data between the source and destination has changed. If the Flag trigger is true then the Hash Table address is a lookup Process in the Hash Table. If the Flag trigger is false then the Learning Flag is observed. If the Learning Flag is true then the Learning process is initiated whereby a new Hash Address is identified for the MAC address in the Hash Table. If the Learning Flag is false then the Scanning process is initiated and the Hash Addresses are scanned in the Hash Table.

FIGS. 11A and 11B show main and remote locations for a network of Wi-Fi access points using the DAS network as the backhaul for the IP data. The Wi-Fi Management Center 1100 interfaces with the internet backbone 1101 and manages all the Wi-Fi access points on the network. The Internet backbone 1101 interfaces with the Digital Access Units (DAU) 1102 in order to transport IP data to and from the DAS Network. The IP data is multiplexed along with the mobile payload data onto a Frame and transported over the DAS Network backhaul. The Digital Remote Units (DRUs) have either an integrated Wi-Fi access point or an external Wi-Fi access point. The Wi-Fi access points connected to the DRUs are used to create a Mesh Network to other Wi-Fi access points. The DAS network will act as the backhaul for the IP data to the Mesh Network of Wi-Fi access points. This topology will facilitate the easy of deployment of the Mesh network of Wi-Fi Access points as they will not require a direct Internet connection at the remote location only a power connection. This architecture will also provide for a Wi-Fi coverage area similar to the Mobile coverage area under the constraint of a limited Wi-Fi transmitter output power.

FIG. 12 shows a block diagram of the coding structure of the transported data, including the payload I/Q data, from multiple inputs. FIG. 12 illustrates how the portions of the data frame structure shown in FIG. 6 are generated. The processing illustrated in FIG. 12 occurs at the DAU for the Downlink path and at the DRU for the uplink path. The scheduler & switch 1208, Error Encoding 1209, Sync 1214, C&M 1215 and Vendor Specific Information 1216 are provided as inputs to the Framer 1210. The payload data (i.e., the raw I & Q data) from multiple input ports as well as the IP Network Traffic are buffered and delivered to a scheduler & switch. The scheduler & switch collates the buffered payload data from the various ports along with the IP Network traffic for the Framer. The scheduler is an algorithm used to ensure fairness amongst the ports and distribute the allocated resources. The scheduler also decides on which of the ports is allocated the resources. As an example IP Network data can be allocated a lower priority in comparison to the payload data from the various ports. The Error Encoder 1209 performs a cyclic redundancy check encoding of the transported data to insure that no errors occur during the data transportation from the DAU to the DRU. The framed data is scrambled 1211 prior to being sent to an encoder 1212. The function of the scrambler is to remove long runs of zeros and ones so as to insure good frame timing synchronization. The payload data is comprised of the downlink cellular data from multiple ports; this data fluctuates with usage and can be prone to long runs of zeros or ones.

FIG. 13 shows the block diagram of the decoding structure of the transported data. The DAU receives the uplink data from the remote units. The serialized data will undergo the following processing steps: de-serializer 1314, decoding 1313, descrambler 1312, synchronization 1311, deframing 1310 followed by dispatching 1308 the data to the various output ports. The deframed data is decomposed into the C&M 1315 data, Vendor information data 1316, error check decoding 1309 and the payload data. The dispatch 1308 routes the scheduled payload data to the various ports. The descrambler performs the inverse operation to the scrambler 1311.

It should be appreciated that the specific processing steps illustrated in FIG. 8 to FIG. 13 provide a particular embodiment of the present invention. Other sequences of steps may also be performed according to alternative embodiments. For example, alternative embodiments of the present invention may perform the steps outlined above in a different order. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

Appendix I is a glossary of terms used herein, including acronyms.

APPENDIX I

Glossary of Terms

ADC Analog to Digital Converter
BPF Bandpass Filter
DAC Digital to Analog Converter
DDC Digital Down Converter
DNC Down Converter
DPA Doherty Power Amplifier
DSP Digital Signal Processing
DUC Digital Up Converter
FPGA Field-Programmable Gate Array
I-Q In-phase/Quadrature
IF Intermediate Frequency
LO Local Oscillator
LPF Low Pass Filter
MCPA Multi-Carrier Power Amplifier
OFDM Orthogonal Frequency Division Multiplexing
PA Power Amplifier
QAM Quadrature Amplitude Modulation
QPSK Quadrature Phase Shift Keying
RF Radio Frequency
UMTS Universal Mobile Telecommunications System
UPC Up Converter
WCDMA Wideband Code Division Multiple Access
WLAN Wireless Local Area Network

What is claimed is:

1. A system for networking Wi-Fi Access Points in a Distributed Antenna System, the system comprising:
   a plurality of Digital Access Units (DAUs) that are coupled and operable to route signals between the plurality of DAUs, the plurality of DAUs including a first DAU that includes:
      a first DAU port that receives first cellular payload data from a first base transceiver station (BTS),
      an Ethernet port that receives Internet Protocol (IP) data, and
      a framer that frames the first cellular payload data and the IP data to form a downlink frame;
   a plurality of Digital Remote Units (DRUs) coupled to the plurality of DAUs and operable to transport signals between DRUs and DAUs, the plurality of DRUs including a plurality of DRU ports, wherein at least a first DRU port receives the downlink frame; and a first plurality of Wi-Fi access points coupled via a mesh network to a second plurality of Wi-Fi access points connected to the plurality of DRUs, wherein at least a first Wi-Fi access point in the first plurality of Wi-Fi access points receives the downlink frame from a second Wi-Fi access point in the second plurality of Wi-Fi access points received from the first DRU port.

2. The system of claim 1, wherein the plurality of DAUs are coupled via at least one of an Ethernet cable, an optical fiber, a microwave line-of-sight link, a wireless link, or a satellite link.

3. The system of claim 1, wherein the plurality of DAUs are coupled to the plurality of DRUs via at least one of an Ethernet cable, an optical fiber, a microwave line-of-sight link, a wireless link, or a satellite link.

4. The system of claim 1, wherein the plurality of DRUs are connected in a daisy chain configuration.

5. The system of claim 1, wherein the plurality of DRUs are connected to the first DAU in a star configuration.

6. The system of claim 1, wherein the plurality of DRUs are connected in a loop to the first DAU.

7. The system of claim 1, further comprising a plurality of Wi-Fi gateways, each Wi-Fi gateway coupled to a corresponding one of the plurality of DRUs.

8. The system of claim 7, wherein each of the plurality of Wi-Fi gateways is integrated into the corresponding one of the plurality of DRUs.

9. The system of claim 7, further comprising a plurality of sets of Wi-Fi access points, each set being coupled via a mesh network to a corresponding one of the plurality of Wi-Fi gateways.

10. The system of claim 1, wherein the first DAU further includes a switch that collates the first cellular payload data and the IP data.

11. The system of claim 10, wherein:
the first DAU further includes an optical port, and
the switch allocates the downlink frame to the optical port.

12. The system of claim 1, wherein the first DAU further includes:
an optical port; and
a scheduler that allocates the downlink frame to the optical port.

* * * * *